United States Patent [19]

Saito

[11] 4,395,335

[45] Jul. 26, 1983

[54] REPRODUCTION METHOD OF FILTER DEMINERALIZER IN CONDENSATE CLEANUP SYSTEM OF REACTOR

[75] Inventor: Toru Saito, Hitachi, Japan

[73] Assignee: Hitachi, Ltd., Tokyo, Japan

[21] Appl. No.: 16,162

[22] Filed: Feb. 28, 1979

[30] Foreign Application Priority Data

Mar. 8, 1978 [JP] Japan .............................. 53-25403

[51] Int. Cl.³ ........................................... B01D 15/04
[52] U.S. Cl. ................................... 210/675; 210/677; 210/686; 210/695; 210/777
[58] Field of Search .................. 210/24, 30 R, 33, 34, 210/42 S, 75

[56] References Cited

U.S. PATENT DOCUMENTS

| | | | |
|---|---|---|---|
| 3,250,704 | 5/1966 | Levendusky | 210/75 X |
| 3,469,057 | 9/1969 | Mains | 210/75 X |
| 3,520,805 | 7/1970 | Ryan | 210/75 |
| 3,539,509 | 11/1970 | Heitmann et al. | 210/222 |
| 3,841,486 | 10/1974 | Heitmann et al. | 210/222 |
| 3,849,196 | 11/1974 | Halloway et al. | 134/1 |
| 3,862,032 | 1/1975 | Dixson | 210/33 |
| 3,869,390 | 3/1975 | Heitmann et al. | 210/222 |
| 3,962,078 | 6/1976 | Hirt | 210/34 |
| 4,033,868 | 7/1977 | Meichsner | 210/75 |

*Primary Examiner*—Robert H. Spitzer
*Attorney, Agent, or Firm*—Antonelli, Terry & Wands

[57] ABSTRACT

A method of reproduction of a filter demineralizer for a cleanup of a condensate backwashes the filter demineralizer to separate ion-exchange resin therefrom. Backwash used for backwashing, and including the ion-exchange resin, is recirculated in a course including a crud removal apparatus to remove the crud thereby providing reproduced ion-exchange resin. On the filter demineralizer from which the ion-exchange resin has been removed, New ion-exchange resin is precoated to form a new ion-exchange resin layer, and then the reproduced ion-exchange resin is deposited on the new ion-exchange resin layer by passing the backwash through the new ion-exchange resin layer.

3 Claims, 2 Drawing Figures

REPRODUCTION METHOD OF FILTER DEMINERALIZER IN CONDENSATE CLEANUP SYSTEM OF REACTOR

BACKGROUND OF THE INVENTION

This invention relates to a reproduction method of a filter demineralizer of a condensate cleanup system in a nuclear reactor power plant, particularly to a method of reproducing the filter demineralizer by reproduction of powdered ion-exchange resin precoated and reusing it.

A boiling water reactor (BWR) uses water condensed in a turbine as coolant thereof. The condensed water or condensate is contaminated with corrosion and erosion products (crud), impurities in incoming water, etc. For the purpose of maintaining clean condensate quality, there is a condensate cleanup system which comprises a filter demineralizer and a condensate demineralizer. The filter demineralizer has a plurality of cylindrical filter mediums arranged in a cylindrical container to filter the condensate therethrough. The filter mediums each comprise a nylon net or the like wound on the outer face of a cylindrical holder with a plurality of throughholes, and a powdered ion-exchange resin layer.

The condensate flowing into the filter demineralizer contains about 60~80 ppb of iron components of a time of a transitional operation after starting of the reactor operation, and several hundred ppb~several ppm of iron components at a time of the usual operation. The iron components include iron crud and iron ions. These iron components are caught by the nylon element and the powdered ion-exchange resin layer. When the iron components are accumulated on the filter mediums by some extent (or after running for a certain time), a pressure drop experienced or evential breakthrough of the iron components from the filter mediums occurs. Therefore, the powdered ion-exchange resin precoated is replaced by new ion-exchange resin, whereby reproduction of the filter demineralizer is carried out. The contaminated ion-exchange resin is discharged out of the condensate cleanup system as waste together with other waste. The waste, which is contaminated with radioactivity, is transferred to a radioactive-waste disposal equipment, reserved there to go into decay, and finally hardened filled in drums.

The number of the drums filled with the used ion-exchange resin is large and reaches to about 60% (percent) in its ratio to that of all the drums filled with the waste generated in the nuclear reactor power station (it is deduced to become 2,000 drums every year in a power plant of the scale in which 1,100 MWe is generated). Such a large number of the drums present large problems, one of which is great expenditure for disposing of the waste, and another is large storage place for the drums difficult to obtain. Therefore, it is desired to minimize the waste discharged out of the system or plant.

As a prior art, there is a U.S. Pat. No. 3,849,196 filed on Nov. 19, 1974. This is concerned with "Ultrasonic Cleaning of Resin" in which contaminated ion exchange-resin is cleaned up by using ultrasonic energy. A similarity between the invention and the U.S. patent is to clean up the ion exchange resin contaminated with crud.

SUMMARY OF THE INVENTION

An object of the invention is to provide a method of reproduction of a filter demineralizer in a condensate cleanup system for a nuclear reactor power plant, whereby an amount of waste discharged out of the plant can be decreased.

Another object of the invention is to provide a method of reproduction of a filter demineralizer in a condensate cleanup system for a nuclear reactor power plant, which method can decrease an amount of new ion-exchange resin fed to the filter demineralizer for precoating it.

Further another object of the invention is to provide a method of reproduction of a filter demineralizer in a condensate cleanup system for a nuclear reactor plant, wherein powdered ion-exchange resin contaminated with crud is reproduced effectively and the reproduced powdered ion-exchange resin is used effectively for cleanup of a condensate so that waste discharged out of the system or the plant can be decreased.

A feature of the invention is to form a precoating layer comprising at least a part of ion-exchange resin which is reproduced by removing crud adhered to the ion-exchange resin deposited on a filter medium of a filter demineralizer.

The precoating layer preferably comprises two kinds of ion-exchange resin layers, one of which is a new ion-exchange resin layer and the other, the reproduced ion-exchange resin layer.

Another feature of the invention is to extract a part of reproduced ion-exchange resin while recirculating it in a course including a crud removal apparatus for the purpose of feeding the reproduced ion-exchange resin to a filter demineralizer by a necessary amount thereof.

Further another feature of the invention will be apparent from the description of the preferred embodiment of the invention referring to Figures of the accompanying drawing.

DESCRIPTION OF THE PREFERRED EMBODIMENT

First, a condensate cleanup system of a nuclear reactor power plant will be described hereinafter, referring to FIG. 1 of the accompanying drawing.

Figure 1:
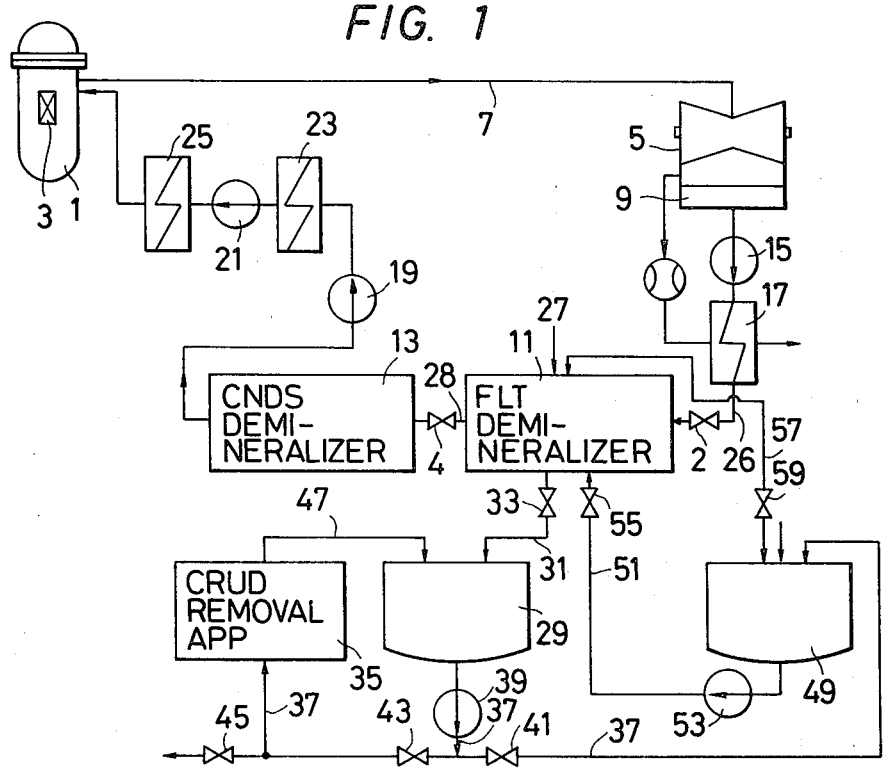
FIG. 1 is a schematic diagram of a nuclear reactor power plant including a condensate cleanup system provided with an embodiment of a filter demineralizer reproduction system according to the invention.

In FIG. 1, a boiling water reactor (BWR) 1 boils coolant at a reactor core 3 to make steam. The steam is delivered to a turbine 5 through a main steam pipe 7. The steam after worked at the turbine 5 is condensed by a condenser 9 to form condensate. The condensate is delivered to a filter demineralizer 11 and a condensate demineralizer 13 by a condensate pump 15 through pipes 26, 28 after deairated by a deairated 17 where condensate is subjected to contamination removal. The clean condensate from the condensate demineralizer 13 is delivered to the reactor core 3 by condensate pumps 19, 21 through a low pressure heater 23 and a high pressure heater 25.

Figure 2:
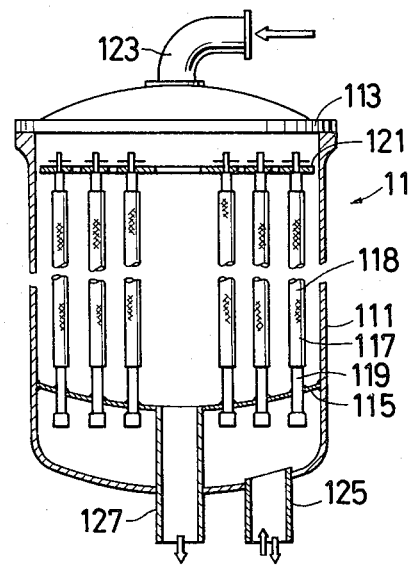
FIG. 2 is a section view of the filter demineralizer used in FIG. 1.

The condensate demineralizer 13 which is known well, consists of a deep bed and a mixture of anion-exchange resin and cation-exchange resin which is contained therein. Referring to FIG. 2, the filter demineralizer 11 is provided with a cylindrical container 111, lid 113 detachably secured to the upper portion of the cylindrical container 111, a lower inner end plate 115 secured to the cylindrical container 111, and a plurality of filter mediums 117. The filter mediums 117 each comprise a cylindrical holder 119 secured to the lower inner end plate 115 and having a plurality of throughholes, and nylon element or net 118 wound around the cylindrical holder 119. The upper portions of all the filter mediums are connected to a lift plate 121 with a plurality of throughholes. A conduit 123 is an inlet for condensate and slurry including ion-exchange resin for precoating. A conduit 125 is an outlet for discharging the condensate and water contained in the slurry. The conduit also is an inlet for fluid for backwashing the filter medium 117, and a conduit 127 is an outlet for the backwash. Powdered ion-exchange resin is precoated on the outer periphery of each of the filter mediums to form an ion-exchange resin layer. As the ion-exchange resin to be precoated, for example, a mixture of anion-exchange resin and cation-exchange resin in the ratio of 1:1 is used. The ion-exchange resin layer precoated is several millimeters in thickness.

The condensate flowing into the filter demineralizer 11 includes contamination such as iron crud and iron ions. Accumulation of such contamination makes a large pressure drop of condensate in the filter demineralizer 11 before the capacity of the ion-exchange has been fully spent. The pressure drop of the condensate is detected by a pair of pressure meters (not shown) provided upstream and downstream of the filter demineralizer 11, respectively.

Next, an embodiment of a reproduction method of the filter demineralizer 11 according to the invention is described hereinafter in detail, referring back to FIG. 1.

In FIG. 1, when the pressure drop of the condensate passing through the filter demineralizer 11 reaches to a certain value, the turbine operation is stopped and a pair of open valves 2, 4 provided upstream and downstream of the filter demineralizer 11, respectively, are closed. The filter demineralizer 11 communicates with a tank 29 receiving a backwash through a pipe 31 with a closed valve 33. The filter demineralizer 11 is backwashed with a water and air supplied through conduit 27, with the closed valve 33 being opened. The backwash including the ion-exchange resin removed from the filter demineralizer 11 by backwashing is contained in the tank 29. The tank 29 is fluidly connected to crud removal apparatus 35 through a piping 37 with a slurry pump 39, and closed valves 41, 43, 45. The crud removal apparatus 35 has a pipe 47 connected to the tank 29. The ion-exchange resin contaminated with crud is circulated together with waste water by the slurry pump 39 in a course of the tank 29, the piping 37, the crud removal apparatus 35, and the pipe 47, with the closed valve 43 being opened. By the recirculation of a slurry comprising the ion-exchange resin and the waste water the crud is selectively removed from the slurry. The crud is mainly iron components. Therefore, as the crud removal apparatus 35, a magnetic filter is preferably used.

On the other hand, precoating of ion-exchange resin on the filter medium is carried out by passing water including the ion-exchange resin through the filter medium so that the ion-exchange resin is accumulated on the filter medium. A tank 49 is for receiving new and reproduced ion-exchange resin and fluidly connected to the filter demineralizer 11 by a pipe 51 with a slurry pump 53 and a closed valve 55, and a pipe 57 with a closed valve 59. Further, the tank 49 is connected to the tank 29 by the piping 37. The conduit 123 of the filter demineralizer 11 shown in FIG. 2 is connected to the pipes 26 and 51 through a changeover valve; the conduit 125, the pipes 27, 28 and 57 through a changeover valve; and the conduit 127, the conduit 31, respectively. An embodiment of a reproduction method of the filter demineralizer according to the present invention is described referring to FIG. 1.

The filter demineralizer 11 backwashed is precoated with new or fresh ion-exchange resin by recirculating a slurry comprising water and the new ion-exchange by the slurry pump 53 in a course of the tank 49, the slurry pump 53, the valve 55, the filter demineralizer 11 and the valve 59, with the closed valves 55 and 59 being opened first of all. After a certain amount of the new ion-exchange resin which is contained prior to precoating is precoated, a certain amount of the reproduced ion-exchange resin is supplied to the tank 49 through the opening 37, and precoated or deposited on the new ion-exchange resin layer. The precoating is effected in the same manner as the new ion-exchange resin is done. The feed of the reproduced ion-exchange resin from the tank 29 to the tank 49 is carried out while recirculating the slurry in the tank 29 in the course of the valve 43, the crud removal apparatus 35 and the pipe 47. The quantity of the slurry fed to the tank 49 is adjusted by opening of the valve 41 and measured by a flow meter (not shown). The slurry becomes an uniform mixture of the ion-exchange resin and water by the recirculation so that precise measurement of the ion-exchange resin amount to be fed can be effected.

A ratio of an amount of the regenerated ion-exchange resin to be precoated to that of the new ion-exchange resin prefers to be 1:1 (by weight). As the ion-exchange resin, for example a mixture of powdered anion-exchange resin and powdered cation-exchange in a range of 1:1 (by weight), the diameter of which resin is about 30µ, is used.

The ion-exchange resin layer precoated is of two layers, one of which comprises the new ion-exchange resin layer precoated on the nylon element, and the other, the reproduced ion-exchange resin precoated on the new ion-exchange resin layer. The arrangement of the ion-exchange resin layers has an advantage that when the crud adhered to the reproduced ion-exchange resin is separated therefrom, for example by condensate pressure, it can be caught by the new ion-exchange resin disposed downstream of the reproduced ion-exchange resin with respect to a condensate flow. The crud removal apparatus 35 can not completely remove the crud from the ion-exchange resin, and a little crud remains therein without being removed. Therefore, such an arrangement of the ion-exchange resin layers is advantageous in that burden on the condensate demineralizer 13 can be decreased.

Surplus of the reproduced ion-exchange resin is transferred to a waste disposal equipment, with the closed valve 45 being opened and the opened valve 41 being closed, and disposed of as solid waste.

The reproduced ion-exchange resin loses part of its capacity of ion exchange, but generally, the filter demineralizer 11 chocks with crud in the condensate and goes into breakthrough to increase a pressure difference between upstream and downstream thereof, before ion break occurs. Therefore, the ion-exchange resin precoated on the filter demineralizer 11 is transferred to the tank 29 receiving backwash as the capacity of ion-exchange resin can effect substantially filtration and ion-exchange.

According to the embodiment described above, half of the ion-exchange resin to be precoated on the filter demineralizer 11 is replaced by the reproduced ion-exchange resin. Therefore, an amount of the ion-exchange resin to be discharged out of the plant is decreased to half of the amount of ion-exchange resin used in a conventional or known method, and the number of drums containing the waste decreases to about 70 percent of these necessary for those conventional methods.

What is claimed is:

1. A method of reproduction of a filter demineralizer in a nuclear reactor condensation cleanup system, comprising the steps of backwashing the filter demineralizer to separate therefrom ion-exchange resin precoated on the filter demineralizer contaminated with crud;

removing the crud from the ion-exchange resin thereby to reproduce the ion-exchange resin; and precoating new ion-exchange resin to form a new ion-exchange resin layer on the filter demineralizer and depositing at least a part of the reproduced ion-exchange resin on the new ion-exchange resin layer to form a reproduced ion-exchange resin layer so that a condensate to be treated will flow from the reproduced ion-exchange resin layer to the new ion-exchange resin layer on the filter demineralizer; the amount of the new ion-exchange resin precoated being nearly equal to the reproduced ion-exchange resin precoated by weight.

2. A method of reproduction of a filter demineralizer for cleanup of a condensate flowing into a nuclear reactor from a turbine, which method comprises the steps of backwashing the filter demineralizer to separate therefrom powdered ion-exchange resin contaminated with crud;

storing backwash including the separated powdered ion-exchange resin in a tank;

recirculating the backwash in a course including the tank and a crud removal apparatus thereby removing the crud from the powdered ion-exchange resin to reproduce the powdered ion-exchange resin;

extracting a part of the backwash recirculating while adjusting the quantity of the backwash extracted;

adding new powdered ion-exchange resin;

precoating the new powdered ion-exchange resin to form a new powdered ion-exchange layer on the filter demineralizer; and depositing the reproduced powdered ion-exchange resin in the extracted backwash on the new powdered ion-exchange resin layer to form a reproduced powdered ion-exchange resin layer on the filter demineralizer; the amount of new powdered ion-exchange resin precoated being nearly equal to the reproduced powdered ion-exchange resin by weight.

3. The method as defined in claim 1 or 2, wherein the crud is removed by a magnetic filter.

* * * * *